United States Patent
Danestad et al.

(10) Patent No.: US 9,131,820 B2
(45) Date of Patent: Sep. 15, 2015

(54) VACUUM CLEANER AND METHOD FOR CONTROLLING AN ELECTRIC MOTOR

(75) Inventors: Ulrik Danestad, Huddinge (SE); Michael Persson, Huddinge (SE)

(73) Assignee: Aktiebolaget Electrolux (SE)

( * ) Notice: Subject to any disclaimer, the term of this patent is extended or adjusted under 35 U.S.C. 154(b) by 596 days.

(21) Appl. No.: 13/318,063

(22) PCT Filed: Apr. 9, 2010

(86) PCT No.: PCT/SE2010/000092
§ 371 (c)(1), (2), (4) Date: Jan. 9, 2012

(87) PCT Pub. No.: WO2010/126422
PCT Pub. Date: Nov. 4, 2010

(65) Prior Publication Data
US 2012/0112670 A1   May 10, 2012

Related U.S. Application Data

(60) Provisional application No. 61/176,736, filed on May 8, 2009.

(30) Foreign Application Priority Data

Apr. 30, 2009  (SE) .................................. 09005943

(51) Int. Cl.
*H02P 1/00* (2006.01)
*A47L 9/28* (2006.01)
(Continued)

(52) U.S. Cl.
CPC ............ *A47L 9/2889* (2013.01); *A47L 9/2831* (2013.01); *A47L 9/2842* (2013.01); *A47L 9/2878* (2013.01); *H02P 7/29* (2013.01); *H02P 7/295* (2013.01); *H02P 2205/03* (2013.01); *Y02B 40/82* (2013.01)

(58) Field of Classification Search
USPC ........... 318/139, 98, 800, 802, 807, 825, 799, 318/438, 508, 509, 510, 729; 323/299, 222, 323/285, 205, 212; 399/88, 67; 15/339, 77, 15/412; 322/29, 20, 32; 123/179.14, 123/179.24
See application file for complete search history.

(56) References Cited

U.S. PATENT DOCUMENTS 7,026,771 B2 *  4/2006  Kushida et al. ................. 318/98
2005/0258793 A1 * 11/2005  Chin et al. ..................... 318/438
(Continued)

FOREIGN PATENT DOCUMENTS

CN      1702953     11/2005
EP      1597995     11/2005
(Continued)

OTHER PUBLICATIONS

Office Action, with an English translation, for Chinese Patent Application No. 201080028804.2 dated Aug. 6, 2014.

*Primary Examiner* — Shawki S Ismail
*Assistant Examiner* — Jorge L Carrasquillo
(74) *Attorney, Agent, or Firm* — RatnerPrestia

(57) ABSTRACT

A vacuum cleaner and a method for controlling the motor power of a vacuum cleaner are disclosed. The vacuum cleaner comprises an electric motor and an electric power supply for providing electric power to the electric motor. Furthermore, a voltage measuring means for measuring a motor voltage over the electric motor and a current measuring means for measuring a motor current flowing through the electric motor are provided. The vacuum cleaner further comprises a control means for controlling, based on the measured voltage and the measured current, the electric power provided to the electric motor from the electric power supply towards a target motor power value.

3 Claims, 2 Drawing Sheets

LEGEND
28=AC POWER SOURCE
30=ELECTRIC MOTOR
32=VOLTAGE MEASURING MEANS
34=CURRENT MEASURING MEANS
36=ACTUAL MOTOR POWER CALCULATION MEANS
38=TARGET MOTOR POWER MEANS
40=CONTROL MEANS
41=ZERO-CROSS DETECTING MEANS

(51) Int. Cl.
*H02P 7/29* (2006.01)
*H02P 7/295* (2006.01)

(56) References Cited

U.S. PATENT DOCUMENTS

2007/0175429 A1* 8/2007 Yanagida et al. ........ 123/179.14
2008/0048619 A1* 2/2008 Yoshida ..................... 320/134
2009/0179626 A1* 7/2009 Smith et al. ................. 323/299

FOREIGN PATENT DOCUMENTS

| JP | 09112439 A * | 5/1997 |
| JP | 11128134 | 5/1999 |
| JP | 11128134 A * | 5/1999 |
| JP | 2000139792 | 5/2000 |
| JP | 2008188264 | 8/2008 |
| JP | 2008188264 A * | 8/2008 |
| WO | WO 2004/032696 | 4/2004 |
| WO | WO 2004032696 A3 * | 9/2004 |

* cited by examiner

LEGEND
1=VACUUM CLEANER
2=ELECTRIC MOTOR
3=ELECTRICAL POWER SUPPLY
4=VOLTAGE MEASURING MEANS
5=CURRENT MEASURING MEANS
6=CONTROL MEANS

LEGEND
8=DC POWER SUPPLY
10=ELECTRIC MOTOR
12=VOLTAGE MEASURING MEANS
14=CURRENT MEASURING MEANS
16=ACTUAL MOTOR POWER CALCULATION MEANS
18=TARGET MOTOR POWER MEANS
20=CONTROL MEANS

VACUUM CLEANER AND METHOD FOR CONTROLLING AN ELECTRIC MOTOR

FIELD OF THE INVENTION

The invention relates to a vacuum cleaner including an electric motor and control means for controlling the electric motor and a method for controlling an electric motor in a vacuum cleaner.

BACKGROUND OF THE INVENTION

Battery products have a general disadvantage compared to corded AC products since battery capacity is expensive and heavy. Furthermore, battery voltage is reduced during a discharge cycle of a battery. In a battery powered vacuum cleaner including an electric motor, a decrease of battery power during the discharge cycle of the battery will result in a decrease of the suction power of the vacuum cleaner during the discharge cycle of the battery. Generally, the maximum inlet power of a fan unit of a vacuum cleaner powered by battery will decrease with half or more during the discharge cycle of the battery. Also, ageing of the battery will impact the power output such that the initial and highest power available can be reduced with more than a third.

In order to limit the effect of battery voltage reduction over a discharge cycle, feedback control has been provided in prior art battery powered vacuum cleaners. In such prior art vacuum cleaner control, feedback of the voltage over a battery of the vacuum cleaner is used, and the voltage provided over the electric motor is controlled towards a target voltage. This will compensate for the battery voltage reduction during the discharge cycle of the battery and hence, such prior art battery powered vacuum cleaners are less affected by the decreasing battery voltage over the discharge cycle of the battery.

A problem with the prior art methods of controlling battery powered electric motors in vacuum cleaners is that the motor power and hence the suction power has to be limited in order to limit the battery capacity required, as batteries with high capacity are expensive and heavy. In some conditions, e.g. when an inlet of the vacuum cleaner is partially blocked, a dust container of the vacuum cleaner is filled or when a filter of the vacuum cleaner is clogged etc, the suction power of prior art battery powered vacuum cleaners may be less than sufficient.

For corded AC powered vacuum cleaners, voltage reduction over time is not an issue in the same way as for battery powered vacuum cleaners. For such prior art corded AC powered vacuum cleaners the suction power is allowed to vary but at a level which is sufficient for all or at least most conditions. In conditions where the airflow is reduced, the suction power will be reduced. However, these prior art corded AC vacuum cleaners are designed such that the suction power will be sufficient also for conditions with a considerable reduction of airflow. A problem with such prior art corded AC vacuum cleaners is that the overall energy consumption is high.

SUMMARY OF THE INVENTION

According to the invention, the above problems of prior art vacuum cleaners and control thereof are alleviated by providing a vacuum cleaner and a method of claims 1 and 12, respectively.

The invention is based on the understanding that there is a need for more accurate control of motor power of a electric motor in a vacuum cleaner, which control is adapted in view of motor load. More specifically, it should be made possible to control motor power such that a desired suction power is provided which is independent of change of airflow of the vacuum cleaner. A more accurate control of motor power is achieved according to the invention by using both the voltage over the electric motor and the current flowing through the electric motor as feedback parameters for controlling the motor power of an electric motor of a vacuum cleaner.

In prior art vacuum cleaners, using only the voltage as a feedback parameter, motor power is still affected by change of airflow of the vacuum cleaner. For conditions where the airflow of the vacuum cleaner is reduced, e.g. when the inlet of the vacuum cleaner is semi-blocked, when a dust container of the vacuum cleaner is filled, and when a filter of the vacuum cleaner is clogged, the motor power will be reduced. More specifically, a reduction of airflow will reduce the current flowing through the electric motor, and hence the motor power will be reduced even though the voltage is held constant.

Including also the current as a feedback parameter according to the invention will enable more accurate control of the power of the electric motor which in turn will enable a more accurate control of suction power.

For battery powered vacuum cleaners, a more accurate control of the power of the electric motor of the vacuum cleaner and hence a more accurate control of the suction power will enable provision of higher suction power, compared to prior art battery powered vacuum cleaners, in conditions where the airflow is reduced. Furthermore, the suction power can be controlled in view of reduced battery voltage during the discharge cycle of the battery such that a desired suction power is provided.

Moreover, for corded AC powered vacuum cleaners a more accurate control of the motor power in view of the airflow of the vacuum cleaner, i.e. in conditions where the airflow is reduced and in conditions where the airflow is not reduced, will enable an adaptation of motor power such that a sufficient, but not unnecessarily high, motor power is provided. This will enable a lower overall energy consumption than for prior art corded AC vacuum cleaners which generally provide unnecessarily high motor power in conditions where the airflow is not reduced.

According to the invention, a vacuum cleaner is provided comprising an electric motor, and an electric power supply for providing electric power to the electric motor. The vacuum cleaner further comprises a voltage measuring means for measuring a motor voltage over the electric motor, a current measuring means for measuring a motor current flowing through the electric motor, and a control means. The control means controls the electric power provided to the electric motor from the electric power supply. The control is based on the measured voltage and the measured current and is arranged to control the motor power towards a target motor power value.

The electric power supply may be a DC power supply, such as a battery, or an AC power supply, such as mains supply. The electric motor may be of any type suitable for use for vacuum cleaners, being a DC powered motor or an AC powered motor depending on the type of power supply used.

The voltage and current measuring means may be any suitable prior art means for measuring motor voltage and motor current also depending on the power supply used.

The control means for controlling the electric power provided to the electric motor from the electric power supply can be of any suitable type for controlling electrical power based feedback of the measured motor voltage and the measured motor current.

The target motor power is a design parameter and its configuration depends on the desired properties of the vacuum cleaner in which the invention should be embodied. The target motor power can be set to be constant over time or it may vary over time.

The invention is advantageous e.g. since a vacuum cleaner according to the invention can be controlled more accurately than prior art vacuum cleaners with respect to motor power towards a target motor power value.

Compared to a prior art vacuum cleaner designed to have sufficient suction power for conditions where the airflow is not reduced, a vacuum cleaner of the invention can be designed to have sufficient suction power in conditions where the airflow is not reduced, but at the same time have the same or similar motor power, and hence the same or similar suction power, for conditions where the airflow is reduced, whereas the prior art vacuum cleaner would have a lower or even much lower motor power, and hence suction power, for conditions where the airflow is reduced. Hence, in this scenario, a vacuum cleaner of the invention will have sufficient motor power both in conditions where the airflow is reduced and in conditions where the airflow is not reduced, whereas the prior art vacuum cleaner would have an insufficient suction power in conditions where the airflow is reduced.

Compared to a prior art vacuum cleaner designed to have sufficient suction power for conditions where the airflow is reduced to a given extent, a vacuum cleaner of the invention can be designed to have sufficient suction power in conditions where the airflow is reduced to such an extent, but at the same time have the same or similar motor power for conditions where the airflow is reduced to a lower extent or not reduced at all, whereas the prior art vacuum cleaner would have a higher or even much higher motor power for conditions where the airflow is reduced to a lower extent or not reduced at all. Hence, in this scenario, a vacuum cleaner of the invention will have a lower energy consumption than prior art vacuum cleaners when used in conditions where the airflow is reduced to a lower extent or not reduced at all and the same or similar energy consumption as prior art vacuum cleaners when used in conditions where the airflow is reduced.

According to the invention a vacuum cleaner is enabled having the characteristics of a prior art high power vacuum cleaner in conditions where the airflow is reduced and the characteristics of a prior art low energy vacuum cleaner in conditions where the airflow is not reduced.

In one embodiment the invention, the target motor power value is constant. For example, the target motor power may be set to a constant value which is designed for a vacuum cleaner to provide sufficient suction power in conditions where airflow is reduced to a given extent compared to full airflow.

In another embodiment of the invention, the target motor power depends on the measured motor current. For example, the target motor power may be designed to increase when the measured motor current decreases under a first current threshold. This would enable an increased motor power in conditions where the airflow is reduced to a certain extent corresponding to a current under the first current threshold, e.g. when an object is partially blocking the inlet of the vacuum cleaner. The target motor power may then further be designed to become zero when the measured motor current decreases under a second current threshold lower than the first current threshold. This would enable a switch off of the motor power in conditions where the airflow is reduced to next to zero corresponding to a current at the second current threshold, e.g. when an object is almost completely blocking the inlet of the vacuum cleaner.

The target motor power may also be made dependent on the measured motor voltage, or on a combination of measured motor current and the measured motor voltage.

The target motor power may also be made dependent on other input data from the electric motor of the vacuum cleaner, such as operating time from last complete charging of battery, charging state of the battery etc. in order to enable sufficient suction power whilst ensuring proper functioning of the electric motor. Moreover, the target motor power may also be set in view of a mode of the vacuum cleaner, such as a high power mode where suction power is prioritized over low energy consumption and a low power mode where low energy consumption is prioritized over suction power.

In an embodiment of the invention, the vacuum cleaner further comprises an actual motor power calculation means for calculating an actual motor power of the electric motor from the measured motor voltage and the measured motor current, and a target motor power value means for providing a target motor power value. In this embodiment the control means is arranged for receiving the actual motor power value from the actual motor power calculation means and the target motor power value from the target motor power value means. Based on the received actual motor power value and the target motor power value, the control means controls the electric power provided to the electric motor from the electric power supply towards the target motor power value.

In one embodiment of the invention, the vacuum cleaner further comprises a switching means for switching between an on state where a voltage is applied over the electric motor and an off state where no voltage is applied over the electric motor, and a switching controlling means for providing a control signal to the switching means. The control signal is based on the actual motor power value and the target motor power value and is arranged to switch the switching means between the on state and the off state such that the average electric power provided to the electric motor from the electric power supply becomes closer to the target motor power value.

In one embodiment of the invention the electric power supply is a DC power supply. In this embodiment the switching means is a transistor means, such as a MOSFET, and the switching controlling means is a Pulse Width Modulation (PWM) means. The PWM means is arranged to provide a square wave to the transistor means. The square wave is based on the actual motor power value and the target motor power value and is arranged to switch the transistor means between the on state and the off state such that the average electric power provided to the electric motor from the electric power supply becomes closer to the target motor power value. More specifically, the transistor means will be controlled to be in the on state a fraction of the time such that the average electric power provided to the electric motor from the electric power supply becomes closer to the target motor power value than the actual motor power value.

In one embodiment of the invention the electric power supply is a battery.

The invention is advantageous for vacuum cleaners having a battery power supply as a more accurate control of motor power is provided than in prior art battery powered vacuum cleaners. Providing a more accurate control of the motor power enables provision of a desired suction power in conditions where the airflow is reduced which is not possible in prior art vacuum cleaners where the power control is based on the voltage only. At the same time, as the motor power is more accurately controlled, the motor power of a battery powered vacuum cleaner according to the invention can be controlled not to be higher than for prior art battery powered vacuum cleaners in conditions where the airflow is not reduced.

Hence, no unnecessary energy consumption will arise in conditions where the airflow is not reduced. This is advantageous for battery powered vacuum cleaners, as battery power is expensive and heavy.

Furthermore, basing the control of motor power only on a measured current flowing through the motor would not provide similarly accurate control as the battery voltage will vary non-linearly over the battery discharge cycle.

In another embodiment the electric power supply is an AC supply. In this embodiment the switching means is a diode means, such as a bi-directional thyristor. The vacuum cleaner further comprises a zero detection unit for detecting a zero crossing of the AC signal and providing an indication of zero crossing. Furthermore, the control means comprises a time delay means for receiving the indication of zero crossing from the zero detecting means and for providing a time delay, the time delay being based on the actual motor power value and the target motor power value and determined such that a control signal is sent from the control means with said time delay from each zero crossing to switch the switching means between the off state and the on state such that the average electric power provided to the electric motor from the electric power supply becomes closer to the target motor power value.

According to a further aspect of the invention a method for controlling an electric motor driven by a electric power supply in a vacuum cleaner is provided. According to the method a motor voltage over the electric motor and a motor current flowing through the electric motor are measured. Based on the measured motor voltage and the measured motor current, the electric power provided to the electric motor from the electric power supply is controlled towards a target motor power value.

According to a further aspect of the invention a method for controlling an electric motor driven by a electric power supply in a vacuum cleaner is provided. According to the method a motor voltage over the electric motor and a motor current flowing through the electric motor are measured. Based on the measured motor voltage and the measured motor current, the electric power provided to the electric motor from the electric power supply is controlled towards a target motor power value.

In an embodiment of the method according to the invention an actual motor power from the measured motor voltage and the measured motor current is calculated, a target motor power value is provided. The electric power provided to the electric motor from the electric power supply is then controlled based on the actual motor power value and the target motor power value.

In a further embodiment of the method according to the invention, voltage is applied over the electric motor a fraction in time. The electric power provided to the electric motor from the electric power supply is then controlled by changing the fraction of time voltage is applied such that the average electric power provided to the electric motor from the electric power supply becomes closer to the target motor power value.

BRIEF DESCRIPTION OF THE DRAWINGS

The present invention will become more apparent from the following detailed description of exemplary embodiments together with the accompanying drawings wherein.

DETAILED DESCRIPTION OF THE INVENTION

Figure 1:
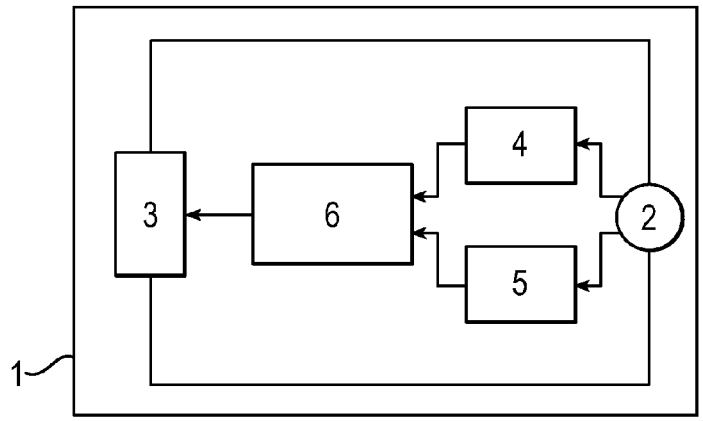
FIG. 1 is a is a schematic block diagram illustrating a vacuum cleaner according to the present invention.

The invention can be embodied in a general vacuum cleaner. FIG. 1 is a schematic block diagram of a vacuum cleaner 1 according to the invention, The vacuum cleaner 1, includes an electrical motor 2 powered by an electrical power supply 3. The vacuum cleaner 1 further comprises a voltage measuring means 4, a current measuring means 5, and a control means 6 for controlling the electric power applied to the electric motor 2 based on measurements made by the voltage measuring means 4 and current measuring means 6.

Figure 2:
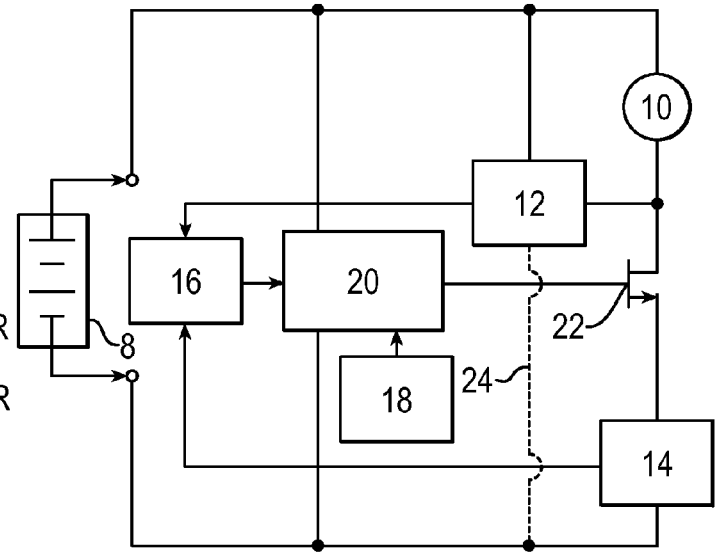
FIG. 2 is a schematic block diagram illustrating a vacuum cleaner according to a first embodiment of the present invention.

A first embodiment of a vacuum cleaner according to the invention is shown in the schematic block diagram of FIG. 2. A DC power supply 8, e.g. a battery, powers an electric motor 10.

In the first embodiment the electric motor 10 is connected to a fan (not shown) which creates an airflow through the vacuum cleaner. A voltage measuring means 12 and a current measuring means 14 are provided. The voltage measuring means 12 measures a motor voltage applied over the electric motor 10 and the current measuring means 14 measures the motor current flowing through the electric motor 10. Such devices are known in the art and need not be explained herein. The voltage measuring means 12 and the current measuring means 14 provide the measured motor voltage and the measured motor current, respectively, to an actual motor power calculation means 16, such as an appropriately programmed computer processor or other device. The actual power calculation means 16 calculates the actual motor power value and provides the actual motor power value to a control means 20. Furthermore, a target motor power means 18 provides a target motor power value to the control means 20. The control means 20 are arranged to control the electric power to the electric motor 10 based on the actual motor power value and the target motor power value.

The control means 20 in the first embodiment comprises a pulse width modulation (PWM) signal generating means for generating a control signal in the form of a PWM signal and a processor means for determining the characteristics of the PWM signal based on the actual motor power value and target motor power value of the control means 20. The PWM signal can be generated by prior art methods for generating PWM signals. Furthermore, the first embodiment includes a switching means in the form of a MOSFET 22 or similar connected between the control means 20 and the motor 10.

When the power voltage from the DC power supply 8 is applied to the control means 20 and a PWM signal formed with a period P is supplied to a gate of the MOSFET 22, the motor 10 is periodically switched on for the time T. A duty cycle D of the PWM signal is calculated as $D=T/P$. Hence, the larger the duty cycle D, the larger the applied power to the electric motor 10. Hence, the control means 20 can control the applied power to the electric motor 10 by varying the duty cycle D of PWM signal from the PWM signal generating means.

In operation, the actual motor power value applied to the electric motor 10 is determined by measuring the motor voltage and motor current by means of the voltage measuring means 12 and current measuring means 14, respectively. The measured motor voltage and motor current are fed to the actual motor power calculation means 16 and the actual motor power level is calculated and fed to the control means 20. Furthermore, the target motor power level is fed from the target motor power means 18 to the control means 20. The control means 20 then controls the applied motor power to the electric motor 10 by varying the duty cycle of the PWM signal provided by the PWM signal generating means.

When an airflow of the vacuum cleaner is reduced, e.g. by partial blocking of an inlet to the vacuum cleaner, the load on the electric motor 10 is reduced resulting in a reduction of electric current flowing through the motor 10. This will result in a decrease of the actual motor power level. The control means 20 will control the PWM signal generating means to provide a PWM signal which increases the electric power applied to the motor 10 towards the target motor power level provided by the target power means 18. This is done by increasing the duty cycle of the PWM signal. When the airflow is increased, the control means 20 will control the PWM signal generating means to provide a PWM signal which decreases the electric power provided to the motor 10 towards the target motor power provided by the target power means 18. This is done by decreasing the duty cycle of the PWM signal. In the following, two exemplary control modes are described with respect to the first embodiment.

In a first control mode, the control mechanism of the control means 20 is designed to produce a constant motor power independent of the airflow. In this control mode the target motor power value provided by the target motor power means 18 is constant. When the actual motor power is reduced, resulting from a reduced airflow, the control means 20 will increase the duty cycle of the PWM signal provided by the PWM signal generating means in order to compensate for the decreased motor power such that the motor power is controlled towards the constant target motor power value. Similarly, when the actual motor power is increased again, resulting from the airflow returning back to full airflow after being reduced, the control means 20 will decrease the duty cycle of the PWM signal provided by the PWM signal generating means in order to compensate for the increased motor power such that the motor power is controlled towards the constant target motor power value.

In the first control mode, the vacuum cleaner will have an essentially constant motor power regardless of the airflow. The vacuum cleaner will have the characteristics of a prior art high power vacuum cleaner in conditions where the airflow is reduced, and the characteristics of a prior art low energy vacuum cleaner in conditions where the airflow is not reduced.

In a second control mode the control mechanism of the control means 20 is designed to produce a motor power varying with varying airflow. In this control mode the target motor power value provided by the target motor power means 18 is made dependent of motor current. When the actual motor power is reduced, resulting from a reduced airflow, the target motor power value will be increased by a given amount from an original target motor power value to an increased target motor power value as long as the motor current is above a first current threshold. Furthermore, the control means 20 will increase the duty cycle of the PWM signal provided by the PWM signal generating means in order to compensate for the decreased motor power such that the motor power is controlled towards the increased target motor power value. Similarly, when the actual motor power is increased again, resulting from the airflow returning back to full airflow after being reduced, the target motor power value will be reduced back to the original target motor power value. Furthermore, the control means 20 will decrease the duty cycle of the PWM signal provided by the PWM signal generating means in order to compensate for the increased motor power such that the motor power is controlled towards the original target motor power value.

Furthermore, in the second control mode, a second current threshold may be defined corresponding to the airflow through the vacuum cleaner being completely stopped, e.g. due a complete blocking of the inlet to the vacuum cleaner. In such a case, i.e. when the motor current falls below the second current threshold, the control means 20 will decrease the electric power applied to the motor 20 to zero, i.e. effectively switch of the electric power applied to the motor 20.

The second control mode is especially suitable for a vacuum cleaner to cope with situations where a small object is blocking the inlet to the vacuum cleaner by providing an increased motor power, and hence an increased suction power, to transport such an object through the inlet and further on into a dust container of the vacuum cleaner. At the same time a complete blocking of the inlet by a large object will cause the control means 20 to stop the motor such that a user of the vacuum cleaner may remove the object.

In addition to measuring the voltage applied over the motor 10 in the first embodiment, measuring of the voltage over the battery 8 may also be provided by the voltage measuring means 12 as indicated by a dashed line 24. Battery voltage can be used in the control of the electric power, for determining the target motor power, for monitoring the battery status and/or controlling battery operation, etc.

Figure 3:
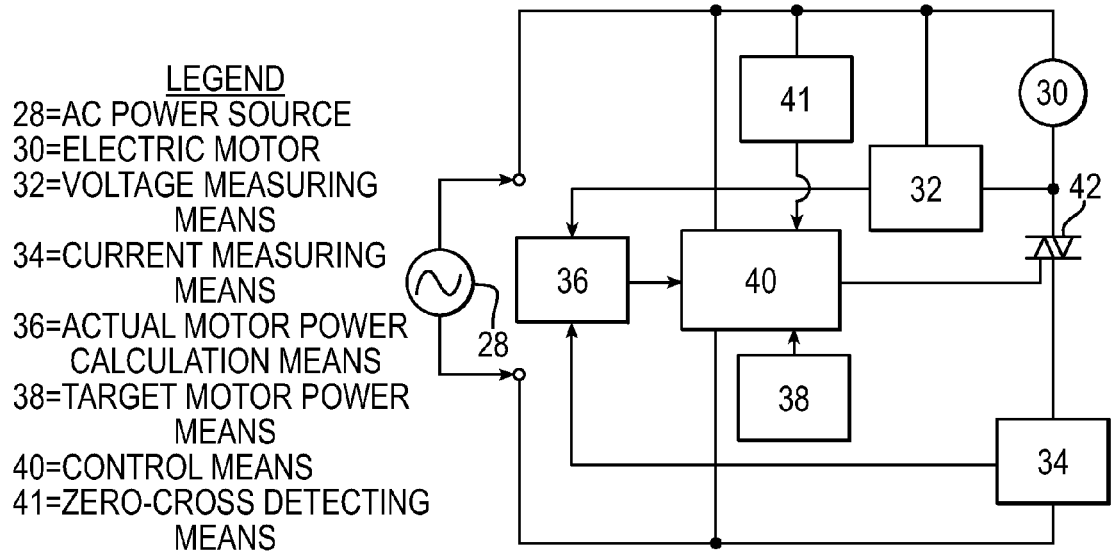
FIG. 3 is a schematic block diagram illustrating a vacuum cleaner according to a second embodiment of the present invention.

A second embodiment of a vacuum cleaner according to the invention is outlined in the schematic block diagram of FIG. 3. In the vacuum cleaner according to the second embodiment, an electric motor 30 is powered by an AC power source 28.

As in the first embodiment, in the second embodiment the electric motor 30 is connected to a fan (not shown) which creates an airflow through the vacuum cleaner. A voltage measuring means 32 and a current measuring means 34 are provided for measuring a motor voltage applied over the electric motor 30 and a motor current flowing through the electric motor 30, respectively. The measured motor voltage and motor current are fed to an actual motor power calculation means 36 which calculates the actual motor power and feeds it to a control means 40 for controlling the electric power to the electric motor 30. Furthermore, a target motor power means 38 provides a target motor power value to the control means 40.

A zero-cross detecting means 41 generates a zero-cross signal when the zero-cross detecting means 41 detects the zero-cross point of AC voltage from the AC power supply 28.

The control means 40 of the second embodiment includes a time delay means for generating a time delay and a processor means for determining the time delay based on the actual motor power value and the target motor power value. The control means 40 is further arranged to provide a control signal after the determined time delay in relation to a zero-cross point as indicated by the zero-cross signal.

The second embodiment comprises a switching means in the form of a bi-directional thyristor 42 or similar connected between the motor 30 and the control means 40.

The control means 40 determines a time delay signal based on the actual motor power level, the target motor power level and the zero-cross detection signal received from the zero-cross detection means. The time signal is provided by the time delay means to a gate terminal of the bi-directional thyristor 42.

When a power voltage having a sine waveform from the AC power supply 28 is applied to the control means 40 and the control signal from control means 40 is applied to the gate terminal of the bi-directional thyristor 42, a voltage is generated over the motor 30 because bi-directional thyristor 42 short-circuits until a polarity of the power voltage is inverted. At this time, the zero-cross detection signal is received in the control means 40.

When an airflow into the vacuum cleaner is decreased, the load of the motor 30 decreases. This affects the current flowing through the motor 40 and the voltage applied over the motor 40 such that the applied power to the motor 30 decreases.

When the actual motor power decreases, the control means 40 changes the time delay to shorten the time delay of the control signal to the bidirectional thyristor 42 with reference to the zero-cross point and causes the conducting angle of the bi-directional thyristor 42 to increase. Increase of the conducting angle causes the applied power to the motor 30 to increase.

In operation, the actual electric power applied to the electric motor 30 is determined by measuring the motor voltage and motor current by means of the voltage measuring means 32 and current measuring means 34, respectively. The measured motor voltage and motor current are fed to the actual motor power calculation means 36 and the actual motor power value is calculated and fed to the control means 40. Furthermore, the target motor power level is fed from the target motor power means 38 to the control means 40. The control means 40 then controls the applied motor power to the electric motor 40 by varying the time delay of the control signal provided by the control means 40.

When an airflow of the vacuum cleaner is reduced, e.g. by partial blocking of an inlet to the vacuum cleaner, the load on the electric motor 30 is reduced resulting in a reduction of electric current flowing through the motor 30. This will result in a lower actual motor power. The control means 40 will provide a control signal to the bi-directional thyristor 42 which increases the electric power provided to the motor 30 towards the target motor power provided by the target power means 38. This is done by decreasing the time delay from zero-crossing of the control signal. When the airflow is increased, the control means will provide a signal to the bi-directional thyristor 42 which decreases the electric power provided to the motor 30 towards the target motor power provided by the target power means 38.

The two control modes described with reference to the first embodiment are equally applicable to the second embodiment.

Figure 4:
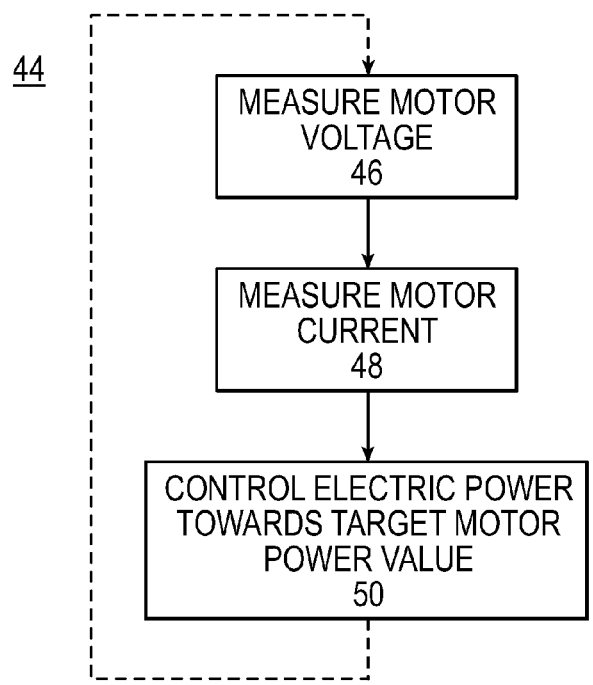
FIG. 4 is a flow chart of a method for controlling a vacuum cleaner according to the invention.

FIG. 4 is a flow chart of a method 44 according to the invention. In the method 44, an electric motor driven by a electric power supply in a vacuum cleaner, such as the ones outlined in FIGS. 1-3, is controlled. When electric power is supplied to the vacuum cleaner, a motor voltage over the electric motor is measured 46 and a motor current flowing through the electric motor is measured 48. Based on the measured motor voltage and the measured motor current, the electric power provided to the electric motor from the electric power supply is controlled 50 towards a target motor power value. For continuous control, the control method continues back to the measuring 46,48 of voltage and current in order to control the electric power provided according to a desired control scheme.

The invention claimed is:

1. A vacuum cleaner comprising:
an electric motor;
an alternating current (AC) power supply for providing electric power to the electric motor;
a voltage measuring means for measuring a motor voltage over the electric motor;
a current measuring means for measuring a motor current flowing through the electric motor;
a control means for controlling, based on the measured motor voltage and the measured current, the electric power provided to the electric motor from the AC power supply towards a target motor power value;
a switching means for switching between an on state where a voltage is applied over the electric motor and an off state where no voltage is applied over the electric motor, the control means being arranged for providing a control signal to the switching means; and
a zero detection unit for detecting a zero crossing of an AC signal from the AC power supply, and providing an indication of zero crossing;
wherein the control means comprises:
a time delay means for receiving the indication of zero crossing from the zero detection unit and for providing a time delay, the time delay being based on an actual motor power value and the target motor power value and determined such that a control signal is sent from the control means with said time delay from each zero crossing to switch the switching means between the off state and the on state such that an average electric power provided to the electric motor from the AC power supply becomes closer to the target motor power value.

2. A vacuum cleaner according to claim 1, wherein the switching means is a diode means.

3. A vacuum cleaner according to claim 1, further comprising an actual motor power calculation means for calculating the actual motor power value of the electric motor from the measured motor voltage and the measured motor current.

* * * * *